United States Patent [19]
Krish

[11] 3,841,865
[45] Oct. 15, 1974

[54] METHOD FOR PRECIPITATING COPPER
[75] Inventor: Kris S. Krish, Gibsonia, Pa.
[73] Assignee: Dravo Corporation, Pittsburgh, Pa.
[22] Filed: Sept. 5, 1972
[21] Appl. No.: 286,451

[52] U.S. Cl.................................. 75/109, 23/252
[51] Int. Cl.................................................. C22b 3/00
[58] Field of Search........ 423/42, 512; 75/108, 109, 75/107, 119; 209/175, 176, 192, 201; 210/42, 44

[56] References Cited
UNITED STATES PATENTS
2,981,413  4/1961  Fitch................................. 209/211
3,154,411  10/1964  Back et al............................ 75/109

*Primary Examiner*—Earl C. Thomas
*Assistant Examiner*—Eugene T. Wheelock
*Attorney, Agent, or Firm*—Parmelee, Miller, Welsh & Kratz

[57] ABSTRACT

Improvements in a process whereby iron mini-pellet precipitants are dynamically suspended in copper pregnant solutions by constantly introducing fresh pellets and solution into the treatment vessel by bouncing the pellets and fresh solution off a diffuser plate thus creating an upward migratory motion, and by recirculating pellets and solution from the bottom of the vessel to the top creating a vortex. This vortex helps dislodge the particulated copper from the pellet precipitants by directing the pellets into baffle plates. The particulated copper rises with the spent solution and flows out of the vessel.

7 Claims, 1 Drawing Figure

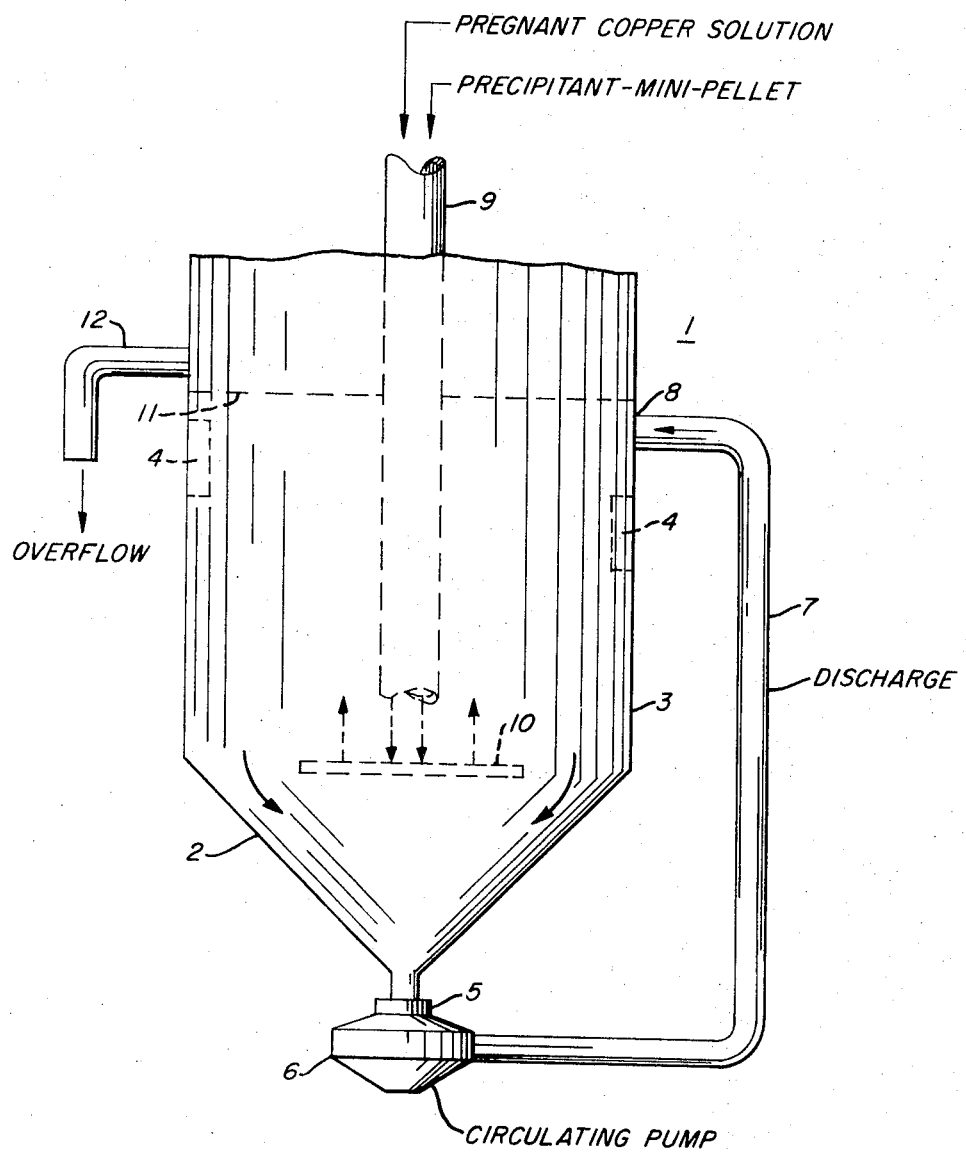

3,841,865

METHOD FOR PRECIPITATING COPPER

FIELD OF THE INVENTION

This invention relates to the art of precipitating substances, particularly metals such as copper from solutions containing same, onto solid precipitants such as metallic iron.

PRIOR ART

It has long been common practice to precipitate metals from solution on other metals higher in the electromotive series than the metal to be precipitated. Thus, the cementation of copper on metallic iron from copper pregnant solutions is a usual method employed by the extractive metallurgical art. Currently there are two methods of recovery. The first is to run the pregnant solution down a launder containing scrap iron, and hosing off and recovering the precipitated copper at intervals. The second recovery method is to utilize what is called a cone precipitator, in which scrap or pelletized iron is disposed inside the cone section and then the pregnant solution is added by pumping it into the apex of the cone. The uprising solution reacts with shredded or pelletized iron and copper is precipitated thereon.

There are problems in the present practises which are solved in the present invention, for example: The reaction rates obtained in both launder and cone type of apparatus are relatively slower. It is difficult to continuously feed shredded or pelletized iron to launder and cone type apparatus. Further it is difficult to keep shredded and pelletized iron in dynamic suspensions.

SUMMARY OF THE INVENTION

The purpose of this invention is to make a more rapid, economical and efficient process for the removal of copper from pregnant solutions.

This is accomplished by dynamically suspended iron mini-pellet precipitants in a copper pregnant solution. The dynamic suspension is created by continually bouncing premixed fresh pellets and solution into the solution off a diffuser plate placed below the inflow tube, and be constantly withdrawing solution and pellets from the bottom of the treatment vessel and reentering them into the vessel as a circulating stream. The circulating stream creates a vortex which is dissipated by baffle plates located on the vertical walls of the treatment vessel which serve two additional purposes. The first is to suspend the pellets in the solution by falling out of the vortex after they strike the plates. The second is to dislodge the precipitated copper from the pellets to allow more copper to precipitate onto the pellets.

The copper precipitant being finer and lighter migrates to the top of the treatment vessel as does the solution because of the upward impetus given the solution by the diffuser plate. The solution stripped of copper by passing through the dynamically suspended iron pellets, and the precipitated copper, passes upward through a mesh screen and out of the treatment vessel through an overflow pipe into a settling pond.

BRIEF DESCRIPTION OF THE DRAWING

FIG. 1 is a schematic representation of the apparatus used to carry out the invention.

DESCRIPTION OF THE PREFERRED EMBODIMENT

One embodiment of the apparatus of this invention is shown in FIG. 1 and consists of a cylindrical treatment vessel 1 which consists of an inverted cone section 2 having a wall which slants apart in an upward direction and connects to a substantially vertical wall portion 3. The lower section is conical to prevent adherence of solid particles thereon. Welded perpendicular to the inside of the vertical wall are several short oblong baffle plates 4. The conical section 2 is connected at its apex to a suction flange 5 of a centrifugal pump 6, mounted vertically and driven by a suitable electric motor. Connected to the centrifugal pump 6 is a discharge pipe 7 which terminates tangentially at the top of the cylindrical treatment vessel 1 at a point 8. A cylindrical down pipe 9 placed over the apex of the cone extends from the top of the treatment vessel to the top of the inverted cone section 2 and is supported by suitable angles and braces, not shown. A circular stainless steel diffuser plate 10, supported by suitable angles and braces not shown, is disposed centrally within vessel 1, proximate the top of the cone section 2, and is a distance equal to twice the diameter of the down pipe, away from the bottom of the down pipe. The diffuser plate 10 is disposed transverse to the longitudinal axis of the vertically disposed down pipe 9 and has a cross sectional area which is three times as large as that of the down pipe 9. There is also a stainless steel number ten size mesh screen 11 located above the pump discharge pipe entry point 8, and extending over the entire cross-section of the treatment vessel. This mesh may vary, however, it must be of size that permits the copper particles to escape the vessel, and yet small enough to restrain the still useable iron mini-pellets from escaping the vessel. Above the screen in the wall of treatment vessel 1 an overflow pipe 12 is provided which leads to a settling tank (not shown).

In one method of practicing this invention copper pregnant solution and iron mini-pellet-precipitant of about ⅛ inch average diameter are introduced into the treatment vessel 1 through the down pipe 9. As the solution and mini-pellets are discharged from the down pipe they bounce off diffuser plate 10 and are dispersed and diffused in a violent manner. Solution and pellets bouncing off diffuser plate 10 also provides necessary turbulence to retain a condition of dynamic suspension in the system. A portion of both the solution and the mini-pellets are drawn into the suction side of the circulating pump 6, at a rate of normally three to six times the inflow rate of the incoming mixture of pellets and pregnant copper solution, and pumped through the discharge pipe 7. The pipe 7 discharges in a tangential manner at point 8 creating a vortex which is broken up by baffle plates 12 to assist in maintaining a state of dynamic suspension. This constant and rapid recirculating of solution and precipitant-mini-pellets effectively increases the possible reaction time without a corresponding increase in the volume of the apparatus.

The precipitated copper, resulting from he chemical reaction between the pregnant copper solution and pre-reduced the is separated from the iron mini-pellets by the collisions between the pellets and the collisions between the pellets and baffle plates 4. This particulate copper and spent solution migrate upward in treatment vessel 1 through the screen mesh 11, which prevents partially reacted mini-pellets from escaping the system, and flows out of treatment vessel 1 through overflow pipe 12, into a settling pond, (not shown).

A typical copper pregnant solution would consist of copper sulfate in sulfuric acid, and a typical ration of iron to copper would be about 1.2 pounds of pelletized iron with every 1 pound of copper in solution. The percentage of recovery is extremely high.

In the past, the inventions utilized have been time consuming since scrap and/or pelletized iron had to be removed so that the copper could be separated. If the copper was dislodged from the iron and removed, during the reaction, time still had to be spent adding fresh iron so that the reaction could continue. Also the volume of copper was limited since either the fresh solution or the iron precipitants was quickly used up.

In this invention, fresh copper solutions and iron precipitants are constantly being added thus the reaction never ceases due to a lack of agents and greater volumes are handled more rapidly. Further by keeping the solutions in a constant state of agitation the precipitated copper is dislodged from the iron freeing the iron to react once again. In addition since this process requires only one treatment vessel to achieve maximum results, a relatively small reaction vessel can be used to process larger quantities of copper.

The provision of a recirculating loop in which a portion of the solution and precipitant are constantly recirculated at a high flow rate permits optimizing the volume of solution which can be handled using a treatment vessel of limited size.

It should be realized that by the term mini-pellets we also mean crushed iron pellets.

It also must be understood that the treatment vessel and other apparatus exposed to solution be constructed of stainless steel to prevent the copper from precipitating onto the apparatus.

I claim:

1. A method of precipitating copper from pregnant solutions thereof onto iron mini-pellet precipitants, in a treatment vessel having an upper end and a lower inverted cone portion, which method comprises:
    a. constantly adding an initial mixture of pregnant copper solution and iron mini-pellets into the treatment vessel at an entry spaced from the inverted cone portion;
    b. dynamically suspending the pellets and copper from the pregnant solution in the treatment vessel to permit precipitation of copper on the pellets;
    c. constantly drawing off a resulting mixture of solution and pellets from the inverted cone portion of the treatment vessel, and recirculating said resulting mixture to the treatment vessel at a position intermediate the entry for the initial mixture and the upper end of the treatment vessel; and
    d. removing precipitated copper and spent solution from the upper end of the treatment vessel.

2. The method defined in claim 1 wherein the pellets and copper from the pregnant solution are dynamically suspended by causing the initial mixture to bounce off of a diffuser plate into the solution in the treatment vessel.

3. The method defined in claim 1 wherein the pellets and copper from the pregnant solution are dynamically suspended by removing the resulting mixture from the bottom of the treatment vessel and reintroducing said resulting mixture into the treatment vessel in a circulating stream creating a vortex.

4. The method defined in claim 3 wherein the resulting mixture is removed from the treatment vessel at a rate greater than the rate at which the initial mixture is added to the treatment vessel.

5. The method defined in claim 4 wherein the resulting mixture is removed at a rate six times the rate at which the initial mixture is added.

6. The method defined in claim 1 wherein the treatment vessel includes a vertical wall portion having baffle plates located thereon, and the precipitated copper metal is broken from the pellets by causing the pellets to collide with each other and the baffle plates on the vertical wall portion of the treatment vessel.

7. The method defined in claim 1 wherein precipitated copper and spent solution are removed by their overflowing the treatment vessel.

* * * * *